United States Patent [19]

Konstantin

[11] 4,238,267

[45] Dec. 9, 1980

[54] APPARATUS FOR PRODUCING SHRINKABLE PLASTIC CAPS

[76] Inventor: Anatole E. Konstantin, 10 Live Oak Rd., Norwalk, Conn. 06851

[21] Appl. No.: 925,754

[22] Filed: Jul. 18, 1978

[51] Int. Cl.³ .................. B29C 17/04; B29C 27/04
[52] U.S. Cl. .................. 156/380; 53/329; 156/86; 156/215; 156/250; 156/272; 156/499; 156/510; 156/556; 156/567; 215/246
[58] Field of Search .............. 156/85, 86, 165, 170, 156/214, 215, 380, 423, 499, 556, 272, 250, 567, 510; 53/140, 276, 282, 290, 329, 442, 487, 488, 556, 557; 215/246; 113/121 A, 121 F

[56] References Cited

U.S. PATENT DOCUMENTS

| | | | |
|---|---|---|---|
| 3,504,817 | 4/1970 | Heider | 53/442 |
| 3,549,440 | 12/1970 | Adcock et al. | 156/215 |
| 3,720,343 | 3/1973 | Irish | 215/246 |
| 4,065,909 | 1/1978 | Mueller | 53/329 |
| 4,072,549 | 2/1978 | Amberg et al. | 156/215 |

*Primary Examiner*—Caleb Weston

[57] ABSTRACT

The apparatus produces heat-shrinkable plastic caps having a metal containing top, and is comprised of:

(a) at least one mandrel having a flat end-face,
(b) means for placing a metal containing disc coated with heat sensitive adhesive on the end-face of said mandrel,
(c) means for placing a band of preselected length of heat-shrinkable plastic over said mandrel,
(d) heating means for pre-shrinking said plastic band to conform to the shape of said mandrel and to overlay the edge of said disc, said heat-shrinking means imparting insufficient energy to activate the adhesive on said disc, and
(e) electric induction heating means for rapidly heat-sealing said disc to the portion of said band overlaying the disc by activating the heat-sensitive adhesive on said metal containing disc by the heat generated by induction in said metal.

6 Claims, 2 Drawing Figures

APPARATUS FOR PRODUCING SHRINKABLE PLASTIC CAPS

BACKGROUND

This invention relates to apparatus for producing shrink-sealable plastic caps for bottles and the like. The apparatus may be used to produce caps for subsequent use, or provided with means for placing the caps immediately onto the bottles. After the cap has been placed over the mouth and neck of a bottle, it is shrunken to fit tightly, thereby forming a tamper-proof seal. The apparatus may be adapted so as to produce the caps either from plastic tubing and metal foil containing strip, or from precut bands of such tubing, or from precut discs of metal-foil or metal-foil laminates, respectively.

The use of caps made of shrinkable plastic film for sealing bottles, for example, wine bottles, as well as other containers sought to be made tamper-proof is well known. The cap may be made of any suitable transparent or opaque plastic film which can shrunk to form a tight fitting seal around the mouth or neck of the container to be capped. Although wet films whch shrink on drying are known, the preferred materials are commercially available heat-shrinkable films of a polyolefin or polyvinylchloride (PVC).

Machines for placing caps of shrinkable film over bottles are also known. Conventional, such machines include a conveyor which carries the bottles to the capping station. There either the machine places a heat-shrinkable cap over the mouth and neck of the bottle or the cap is placed thereon manually, after which the conveyor carries the bottle through a tunnel-heater which causes the film to shrink tightly around the neck of the bottle. However, machines which are capable of either manufacturing caps or of placing caps onto bottles at speeds sufficiently high to keep up with modern high speed bottle filling machinery, where speeds of up to 150 bottles per minute are desirable, are not available. One reason such high bottle capping speeds have not been attained by the prior art is that the caps, which are stacked for purposes of storage and feeding, tend to stick together, and no mechanical system is believed to have been devised that is capable of placing caps fed from a stack onto bottles at such high rates.

OBJECTS

It is an object of this invention to provide apparatus capable of producing caps of shrinkable plastic film having a metal containing top.

It is another object of this invention to provide apparatus capable of producing caps of heat shrinkable plastic, and of capping bottles therewith at speeds sufficiently high to keep up with bottle filling operations.

SUMMARY OF THE INVENTION

The above and other objects, which will be apparent to those skilled in the art, are achieved by the present invention, which comprises:

apparatus for producing heat-shrinkable plastic caps having a metal containing top comprising in combination:

(a) at least one mandrel having an end-face for positioning and retaining a metal containing disc thereon, (b) means for placing a metal containing disc coated with heat sensitive adhesive on the end-face of said mandrel, (c) means for placing a band of preselected length of heat-shrinkable plastic over said mandrel, the length of said band being sufficient to protrude over the end-face of said mandrel and to overlay the edge of the disc so as to be heat-sealable and said disc, (d) heating means for pre-shrinking said plastic band to conform to the shape of said mandrel and to overlay the edge of said disc, said heating means imparting insufficient energy to activate the adhesive on said disc, and (e) electric induction heating means for rapidly heat-sealing said disc to the portion of said band overlaying the disc by activating the heat-sensitive adhesive on said disc by the heat generated by induction in said metal.

Although for purposes of brevity the term, "disc" is used in the specification and claims to describe the metal foil containing top of the cap, the term, "disc" is not meant to limit the shape of the object to a circular configuration. That is, the disc may be of any two dimensional shape desired, for example, square, hexagonal, octagonal, oval, etc.

In a preferred embodiment of the invention, the apparatus includes means for cutting bands of preselected length from heat-shrinkable plastic tubing, as well as means for dispensing segments of metal foil or metal foil laminate strip coated with heat-sensitive adhesive and for punching or cutting discs from said strip.

In another preferred embodiment of the present invention, the cap manufacturing apparatus includes means for placing the caps on the bottle or other container to be capped. Such apparatus is used in cooperation with conventional means for conveying the bottles to be capped first to their capping station, and after they have been capped, to a conventional heating tunnel for heat shrinking the bands to conform tightly around the mouth and neck of the bottles.

THE DRAWINGS

DETAILED DESCRIPTION

Figure 2:
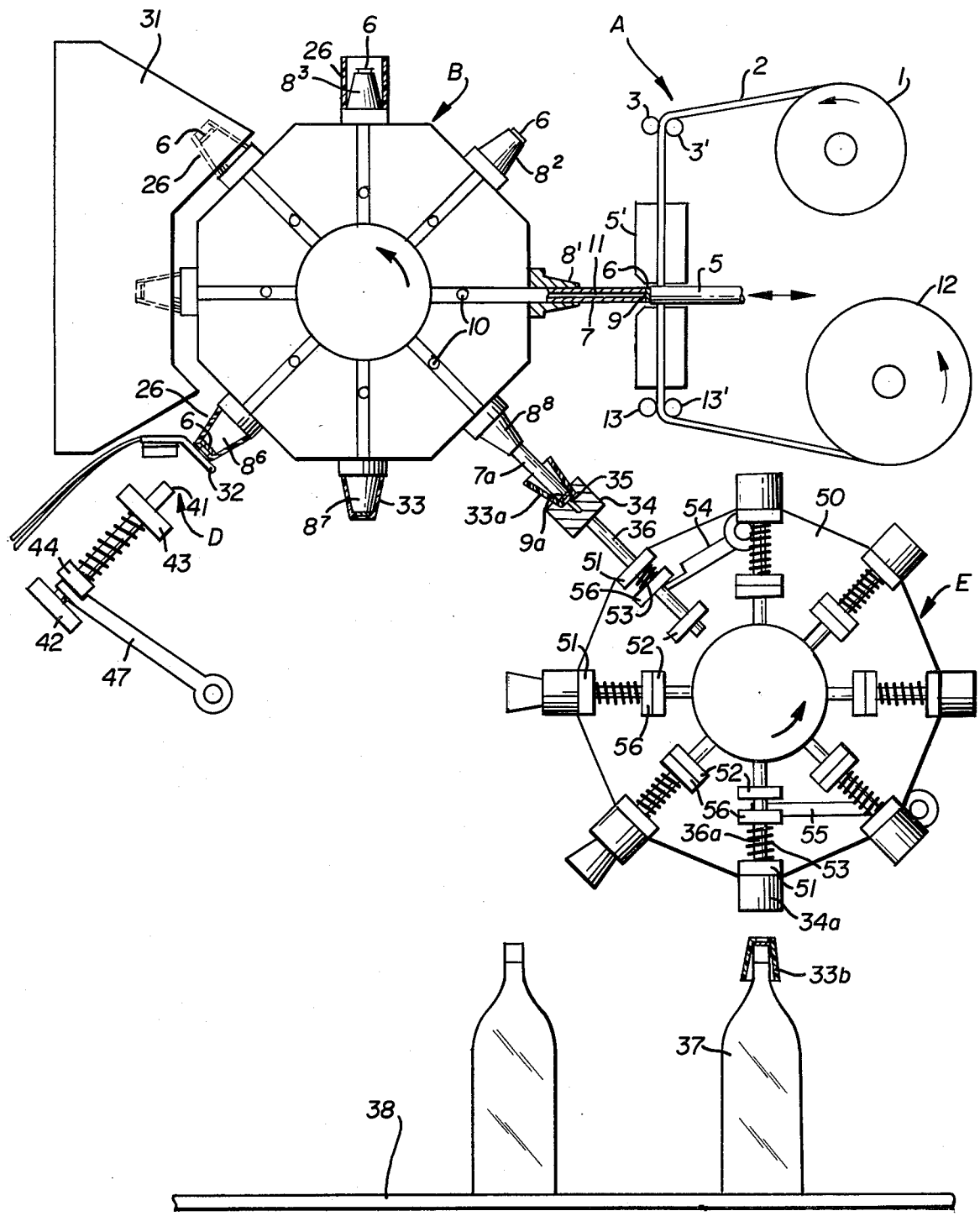
FIG. 2 is an enlarged front view of FIG. 1 illustrating the principal component parts of the present invention.

In order to gain a better understanding of the present invention, reference is made to the drawings which illustrate the best mode for practicing the present invention. The apparatus or machine is comprised of several units or assemblies, including a disc cutting assembly A, a rotating mandrel assembly B, a band cutting assembly C, an induction heating assembly D and a rotating capping assembly E. These units function in timed cooperation with each other as well as with the conveyor 38. Disc cutting assembly A is comprised of spool 1 containing a reel of metal foil strip 2 coated on one side with a heat-sensitive adhesive. The foil strip 2 is fed through a pair of guide rollers 3 and 3' into a punch and die assembly 4 which consists of a rotating cam-driven punch 5 and die 5'. Metal discs 6 of the desired shape are cut from the foil by the punch and die assembly. As punch 5 moves to the left (in FIG. 2) it cuts the disc from the foil.

Mandrel assembly B is comprised of eight mandrels fixedly attached to radiate from a center like the spokes of a wheel and driven so as to be rotatable into various positions around the periphery of the wheel which they form. Each mandrel contains a movable core member, the end-face of which is provided with an orifice which communicates with either a vacuum or air pressure line so that the end-face of each mandrel may apply suction or pressure. In operation, as disc 6 is cut from foil 2, the movable, driven core 7 of the mandrel 8' is extended so as to just make contact with the face of punch 5, thereby picking up disc 6 on the end-face of core 7 by means of suction applied through orifice 9. Suction is provided to orifice 9 by a vacuum line 10 connected to a drilled passage 11 that extends to and terminates in orifice 9. After the disc 6 has been picked up by the extended core 7 of mandrel 8', it is retracted so that the end-face of the core 7 is flush with the end of the mandrel 8'. The core 7 is extended and retracted by means of a timed cam drive (not shown). After a disc 6 is cut from strip 2, the foil strip 2 is advanced a sufficient distance by the wind up spool 12 to permit cutting of the next disc. Strip 2 is guided from the punch and die assembly 4 through a pair of rollers 13 and 13'.

The number of mandrels in the mandrel assembly B may be greater or less than the eight shown in the drawing. Sixteen mandrels are preferred. Mandrel 8' holding disc 6 on its end-face is rotated to an upright position $8^3$ for having a band of preselected length of heat-shrinkable plastic tubing placed over it. The length of said tubing is selected to be sufficiently long to protrude over the end-face of the mandrel and to overlay the disc so as to be heat sealable to the edge of the disc. The mandrels are preferably conical in shape so that the cap, when formed to conform to the contour of the mandrel, will be easily removable therefrom.

Figure 1:
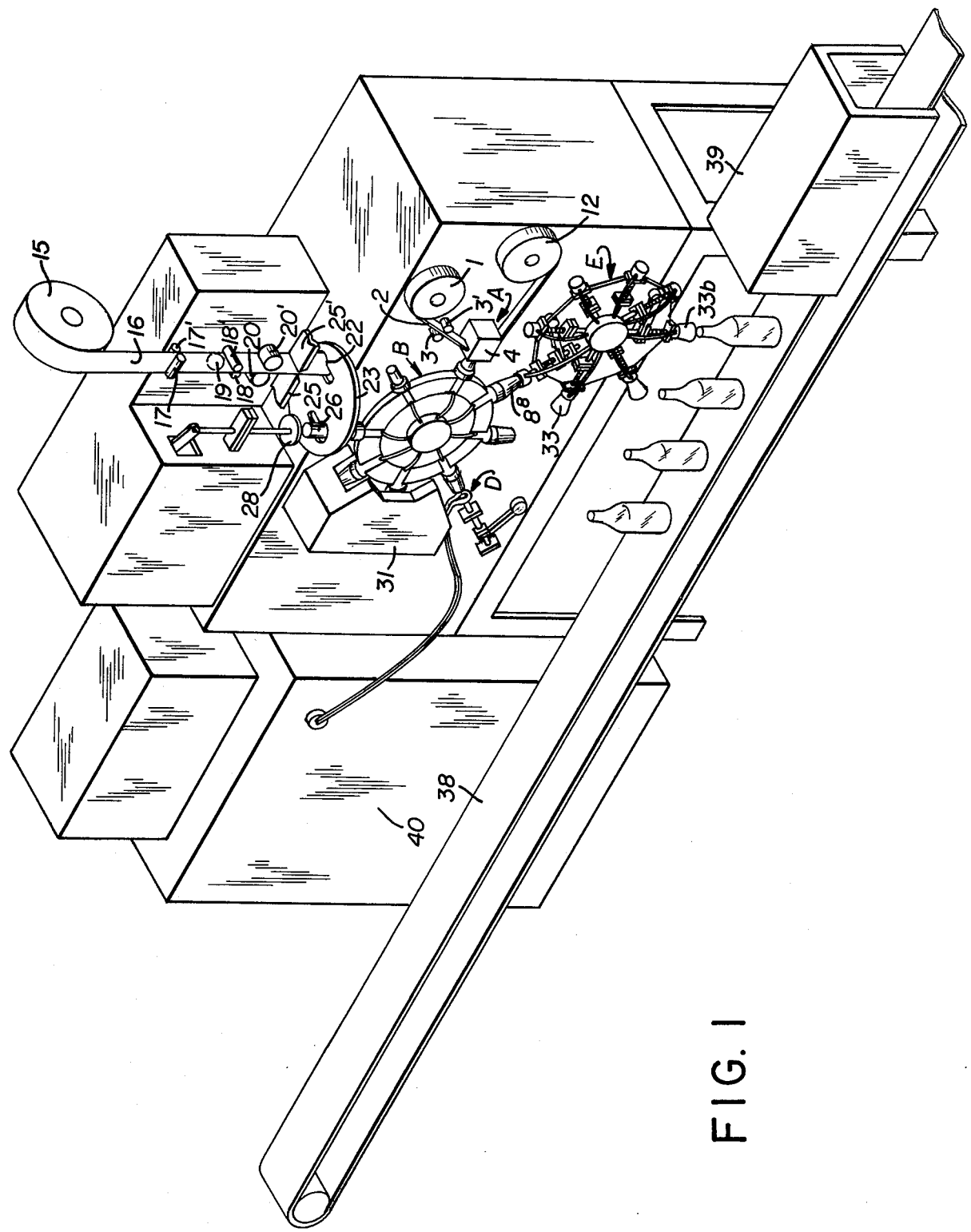
FIG. 1 is a perspective view, illustrating a preferred embodiment of the present invention.

The preferred apparatus for cutting bands from tubing is described in detail in my U.S. Pat. No. 3,924,387, the disclosure of which is incorporated herein by reference. The key elements of the band cutting means are shown in FIG. 1. The band cutting assembly C is comprised of a spool 15 containing a coil of flattened PVC (polyvinylchloride) or other heat-shrinkable plastic tubing 16 which is threaded first through a pair of guide rollers 17 and 17', and then through a tubing opener consisting of a pair of parallel rollers 18 and 18' mounted so that the space between the rollers lies in a plane perpendicular to the plane in which the originally flattened tubing 16 lies. A ball 19, placed inside tubing 16, rests on rollers 18 and 18'. Tubing 16 is reflattened and driven by rollers 20 and 20' to lie in the plane perpendicular to its original or first plane. Tubing 16 is next threaded through the space between blades 25 and 25' and into slot 22 in rotating plate 23 until its front edge is just short of contacting the stationary support plate (not shown) underneath the plate 23 for clearance purposes. Tubing 16 is severed by blades 25 and 25' into a band 26 which springs open inside slot 22. Rotation of plate 23 causes band 26 to be moved into alignment with the banding position and plunger 28.

When a mandrel has been rotated into the upright position $8^3$, it is in position for having the band 26 placed over it. This is done by having band 26 pushed down by plunger 28 as far as desired, in the instant case, until it comes to rest on the mandrel $8^3$, after which the plunger 28 is retracted and the mandrel rotated through a conventional heating tunnel 31. The heat in tunnel 31 is maintained at a temperature sufficiently high to cause band 26 to shrink tightly around and conform to the shape of the mandrel and to overlay the edge of disc 6 held on top of the mandrel. However, disc 6 is not sealed to the band at this time since the temperature in the tunnel 31 is insufficient to activate the adhesive coating on top of disc 6.

The induction heating assembly D is comprised of a water-cooled induction coil 32 fixedly mounted to the frame of the machine such that the coil 32 lies in a plane parallel to and immediately adjacent to the top of each mandrel holding a disc thereon as it moves into position $8^6$. Induction coil 32 is electrically connected to a power source 40. In order to activate and set the adhesive on disc 6, the mandrel is rotated to position $8^6$ where the induction heating coil 32 instantaneously (i.e. in about 0.05 seconds) heats the metal in the disc to a sufficiently high temperature to activate and set the adhesive coating on the disc, thereby binding the edge of the disc to the overlaid portion of the preshrunk plastic band 26, thus forming a plastic cap 33 having a metal top. In order to insure good contact between the disc 6 and the overlaid portion of the band 26, as the mandrel is rotated into position $8^6$, plastic rod 41 is extended through the hole in coil 32 to just make contact with the top of the mandrel. Rod 41 is attached to the frame of the machine by bearing containing blocks 42 and 43 through which rod 41 may slide. Spring 44 located between collar 45 fixedly attached to rod 41 and block 43 keeps rod 41 in a normally retracted position. Rod 41 is extended by appropriately timed oscillation of arm 47 which bears against collar 45 compressing spring 44. When such contact ceases, the spring 44 returns rod 41 to its retracted position.

It should be noted that the disc must contain metal in order to become instantly induction heated. However, this does not require the discs to be made of metal foil only, metal foil laminates with paper, plastic or cloth may be used for the discs as well as such material coated with metallized adhesive.

The mandrel containing the cap is then rotated to the cap discharge position at $8^8$. At this point the caps $33^a$ may be removed from the mandrel by converting the vacuum in the top of the mandrel at orifice $9^a$ to a slight positive air pressure in order to blow the cap off the mandrel while the core $7^a$ is extended. If the plastic cap on the mandrel is still warm from its preshrinking operation, it may tend to stretch when core $7^a$ is extended. This can be prevented by blowing air at the mandrel while it is being rotated through the $8^7$ position in order to cool it.

The caps $33^a$ may at this point be stored for subsequent use, or preferably placed immediately on a bottle as shown by the capping assembly E. Capping assembly E is comprised of eight rotating cups 34, each of which is fixedly attached to eight movable rods 36 that are mounted on a rotating plate 50 in a radial fashion by means of a pair of bearing containing blocks 51 and 52 through which rods 36 are slideable. Rods 36 are retained in their normally retracted position by spring 53, and are extendable by having the driven cam arm 54 exert force on the collar 56 which is fixedly attached to rods 36. Oscillation of the arm 54 compresses the spring 53 and thus extends arms 36 and cups 34 to receive the caps transferred from the mandrel. Transfer of the caps is accomplished by extending mandrel core $7^a$ so that it is met by the extended cup 34 which is provided in its base with a suction (vacuum) orifice 35. Vacuum is applied to orifice 35 at the time that slight air pressure is applied to orifice 9$^a$, thereby transferring the cap 33$^a$ from mandrel 8$^8$ to the cup 34. Following transfer of the cap, core 7$^a$ is retracted, as is rod 36. Cup 34, containing the cap 33$^a$ is then rotated down to the vertical position by conventional motive means (not shown). As a bottle 37 is conveyed to the capping position, rod 36$^a$ is extended by the force exerted by cam arm 55 on collar 56$^a$, thereby placing the cap over the top and neck of bottle 37. Simultaneously, the vacuum in orifice 35$^a$ is shut off and replaced by a slight air pressure which releases cap 33$^b$ from the cup. Cup 34$^a$ is then retracted, leaving the cap 33$^b$ sitting loosely on top of bottle 37 which is then moved by the conveyor 38 through a conventional heating tunnel 39 which causes the cap to shrink further until it conforms to the shape of the neck of the bottle, thereby providing a tight tamper-proof seal.

It will readily be apparent to those skilled in the art that the capping assembly illustrated in the drawings is not essential if one seeks only to manufacture caps. As previously noted, the finished caps removed from mandrel 88 may be stacked or otherwise stored for subsequent use. The caps thus produced may, of course, be placed on the bottles manually or by mechanical means other than that illustrated, and subsequently shrunk to fit tightly around the bottle or other container to be capped. However, in accordance with the preferred embodiment of the present invention shown in the drawings, it is possible to operate the apparatus so as to manufacture up to 150 caps per minute and to cap bottles at the same rate, a feat not previously attained by the art.

The shape and size of the cap may be varied simply by altering the shape and size of the mandrel. Likewise, the metal foil disc may be varied in shape. However, it must be a metal foil containing disc, i.e. metal foil or a metal foil laminate such as described before, in order that the disc be capable of being heated to a sufficiently high temperature very rapidly by induction heat. It is only by such rapid sealing of the disc to the plastic band that makes it possible to produce caps at the high rates desired. In order to produce 150 caps per minute, it is necessary that a cap be produced every 0.4 of a second.

Although the preferred apparatus described above with reference to the drawings is capable of producing the discs from strip material, and of producing the plastic bands from tubing, each or both of these operations may be carried out separately ahead of time if found desirable. In such case, the disc punching assembly would be replaced by means for feeding and placing precut discs from a supply source onto the flat end-face of the mandrel, and the band cutting assembly would be replaced with means for feeding and placing precut bands from a supply source onto the mandrel. Other variations of the present invention will also be apparent to those skilled in the art. For example, the preferred apparatus described has the mandrel assembly and the bottle capping assembly both arranged to rotate like the spokes of a wheel since such structural arrangement is considered to be the most efficient. Other arrangements are, however, possible. For example, the mandrels could be stationary with each of the operations described being caused to take place over it, or the mandrels could be conveyed on a circular horizontal conveyor with each operation taking place at a successive station.

While the preferred material for the disc is an adhesive coated metal foil or metal foil laminate, it will readily be apparent to those skilled in the art that an equivalent material from which the discs may be produced is a paper, plastic or fabric strip coated with a metal powder containing adhesive. That is, the disc may be made of paper, plastic or fabric coated with the metallized adhesive. Alternatively, an adhesive-coated metal fiber containing fabric could be used for the discs. Hence, the term, metal containing disc is intended to cover all of the above-mentioned metal containing materials.

What is claimed is:

1. Apparatus for producing heat-shrinkable plastic caps having a metal containing top comprising in combination:
    (a) at least one mandrel the top of which forms an end-face for positioning a disc thereon, said mandrel being provided with a movable core, the end-face of which forms the top of the mandrel and wherein said core is provided with: (1) a passageway terminating in said end-face as a pneumatic orifice and (2) means for connecting said passageway to a source of vacuum or pressure,
    (b) means for placing a metal containing disc coated with heat sensitive adhesive on the end-face of said mandrel,
    (c) means for placing a band of preselected length of heat-shrinkable plastic over said mandrel, the length of said band being sufficient to protrude over the end-face of said mandrel and to overlay the edge of said disc so as to be heat-sealable to said disc,
    (d) heating means for pre-shrinking said plastic band to conform to the shape of said mandrel and to overlay the edge of said disc, said heat-shrinking means imparting insufficient energy to activate the adhesive on said disc, and
    (e) electric induction heating means for rapidly heat-sealing said disc to the portion of said band overlaying the disc by activating the heat-sensitive adhesive on said disc by the heat generated by induction in the metal.

2. The apparatus of claim 1 which additionally comprises:
    (f) means for removing the caps produced from said mandrel.

3. The apparatus of claim 1, which additionally comprises means for producing said discs from a metal containing strip coated with heat-sensitive adhesive, characterized by means for dispensing segments of said strip into registry with a punch and die assembly.

4. The apparatus of claim 1 which additionally comprises means for cutting a band of preselected length from heat-shrinkable plastic tubing.

5. The apparatus of claim 1 having a plurality of mandrels, said mandrels being coupled to means for moving each mandrel in successive steps through each of said means (b) through (e).

6. Apparatus for producing heat-shrinkable plastic caps having a metal foil containing top, from heat-shrinkable plastic tubing and from metal containing strip material coated with heat-sensitive adhesive, comprising in combination:
    (1) means for dispensing segments of said metal containing strip material into registry with means for punching a disc from said strip,
    (2) means for cutting bands of preselected length from said tubing,
    (3) a plurality of mandrels, each having a movable core, the end-face of which forms the top surface of each mandrel, said end-face being provided with means capable of exerting suction or pressure, each core being extendable in timed registry to contact said disc as it is punched from said strip by said punching means, thereby enabling the top of said core to hold the disc by said suction means, (4) means for placing said bands onto a mandrel holding the disc on its end-face, the length of said band being sufficient to overlay the edge of said disc so as to be heat-sealable thereto, (5) means for heat-shrinking said bands to conform to the shape of said mandrel and to overlay the edge of said disc, (6) electric induction heating means for rapidly heat-sealing each disc to the portion of the band overlaying the disc by activating the heat-sensitive adhesive on said disc by the heat generated by induction in said metal, (7) means for removing the caps produced from said mandrel, and (8) means for moving each mandrel in successive steps and in timed sequence into registry with said means (1), (4), (5), (6) and (7).

* * * * *